(12) United States Patent
Petts et al.

(10) Patent No.: US 10,274,131 B2
(45) Date of Patent: Apr. 30, 2019

(54) DISPLAY SCREEN MOUNTING

(71) Applicant: SBFI Limited International House, London (GB)

(72) Inventors: Hanna Catherine Petts, London (GB); Steven Glen Symonds, London (GB); Andrew Timothy Edwards, London (GB)

(73) Assignee: SBFI Limited International House, London (GB)

( * ) Notice: Subject to any disclaimer, the term of this patent is extended or adjusted under 35 U.S.C. 154(b) by 0 days.

(21) Appl. No.: 15/478,734

(22) Filed: Apr. 4, 2017

(65) Prior Publication Data

US 2018/0209582 A1 Jul. 26, 2018

(30) Foreign Application Priority Data

Jan. 20, 2017 (GB) ..................................... 1701047

(51) Int. Cl.
 *F16M 13/02* (2006.01)
 *F16M 11/04* (2006.01)
 (Continued)

(52) U.S. Cl.
 CPC ........ *F16M 13/022* (2013.01); *F16M 11/041* (2013.01); *F16M 11/043* (2013.01);
 (Continued)

(58) Field of Classification Search
 CPC .... F16M 13/022; F16M 11/041; F16M 11/10; F16M 11/2064; F16M 2200/041;
 (Continued)

(56) References Cited

U.S. PATENT DOCUMENTS

| 4,929,973 | A |   | 5/1990 | Nakatani |
| 5,730,406 | A | * | 3/1998 | Chen ...................... F16M 13/02 |
|           |   |   |        | 248/221.11 |

(Continued)

FOREIGN PATENT DOCUMENTS

WO 2006/132938 A2 12/2006

OTHER PUBLICATIONS

United Kingdom for corresponding UK patent application GB1701047.1, dated Dec. 7, 2017.

(Continued)

*Primary Examiner* — Christopher Garft
(74) *Attorney, Agent, or Firm* — Crawford Maunu PLLC

(57) ABSTRACT

Aspects of the disclosure are directed to apparatuses and methods involving the mounting of display screens. As may be implemented in accordance with one or more embodiments, a mounting head is configured for mounting a display screen and provides an automatic, self-latching/locking function and a manual unlocking function, which allows male and female sections to be unlocked/released and then separated without continued application of a release force to the mounting head. A device is configured for mounting two display screens to a single support, with spacing between the displays being adjustable with a single control that simultaneously separates or brings together the two screen mountings (horizontally side-by-side or vertically). An articulated support arm provides an adjustment mechanism which does not require tools to operate, and which is conveniently integrated into the body of the support arm with the components generally lying on the axis of the arm.

8 Claims, 11 Drawing Sheets

(51) Int. Cl.
*F16M 11/10* (2006.01)
*F16M 11/20* (2006.01)
*F16M 11/24* (2006.01)

(52) U.S. Cl.
CPC ......... *F16M 11/10* (2013.01); *F16M 11/2064* (2013.01); *F16M 11/2092* (2013.01); *F16M 11/24* (2013.01); *F16M 2200/02* (2013.01); *F16M 2200/041* (2013.01); *F16M 2200/044* (2013.01); *F16M 2200/063* (2013.01)

(58) Field of Classification Search
CPC .. F16M 11/043; F16M 11/2092; F16M 11/24; F16M 2200/02; F16M 2200/044; F16M 2200/063
USPC ........ 248/221.11, 177.1, 918, 187.1, 222.11, 248/220.21–220.22, 223.41, 224.51, 248/224.61, 919–922, 407–409, 222.13, 248/121, 122.1, 123.11; 396/425; 403/381, 321, 326, 329, 330
See application file for complete search history.

(56) References Cited

U.S. PATENT DOCUMENTS

| | | | | |
|---|---|---|---|---|
| 6,863,252 B2* | 3/2005 | Bosson | ............... | F16M 11/041 248/131 |
| 7,290,740 B2* | 11/2007 | Joy | ......................... | B60R 11/00 248/187.1 |
| 7,673,838 B2* | 3/2010 | Oddsen, Jr. | .......... | F16M 11/041 248/221.11 |
| 7,891,615 B2* | 2/2011 | Bevirt | .................... | F16M 11/40 248/163.1 |
| 8,020,821 B2* | 9/2011 | Chen | ..................... | F16M 13/02 248/220.22 |
| 8,398,315 B2* | 3/2013 | Johnson | ............... | G03B 17/566 396/422 |
| 2007/0040084 A1* | 2/2007 | Sturman | .............. | F16M 11/105 248/280.11 |
| 2008/0225472 A1 | 9/2008 | Chih | | |
| 2011/0315843 A1* | 12/2011 | Hung | ................... | F16M 11/041 248/279.1 |
| 2015/0053829 A1* | 2/2015 | Lu | ........................ | F16M 13/022 248/123.11 |
| 2015/0342351 A1* | 12/2015 | Hung | ................... | G06F 1/1601 211/26 |
| 2016/0058190 A1* | 3/2016 | Harita | .................. | A47B 97/001 361/679.01 |

OTHER PUBLICATIONS

Extended European Search Report and Written Opinion for corresponding patent application 18151735.0, dated Jun. 20, 2018.

* cited by examiner

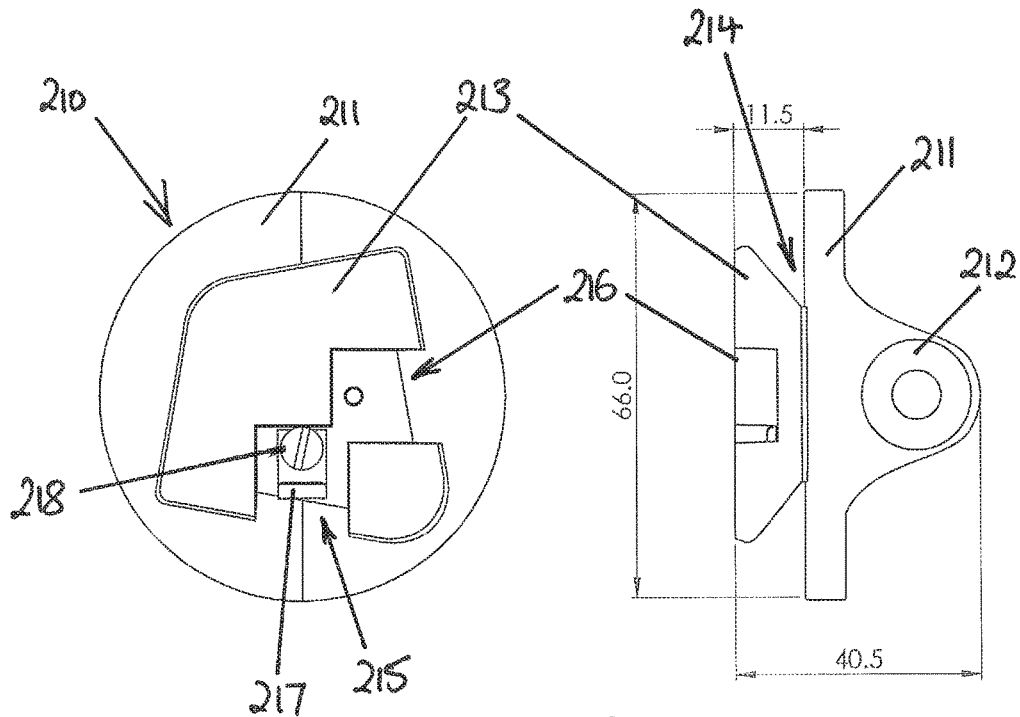
FIG. 5B
FIG. 5C
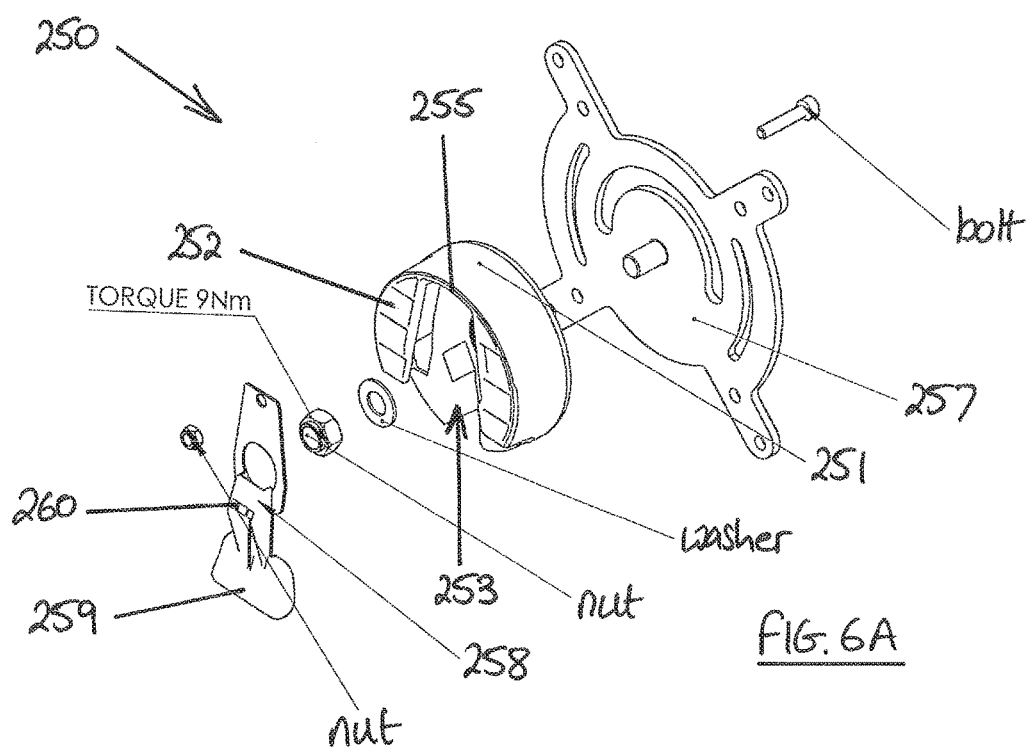
FIG. 6A

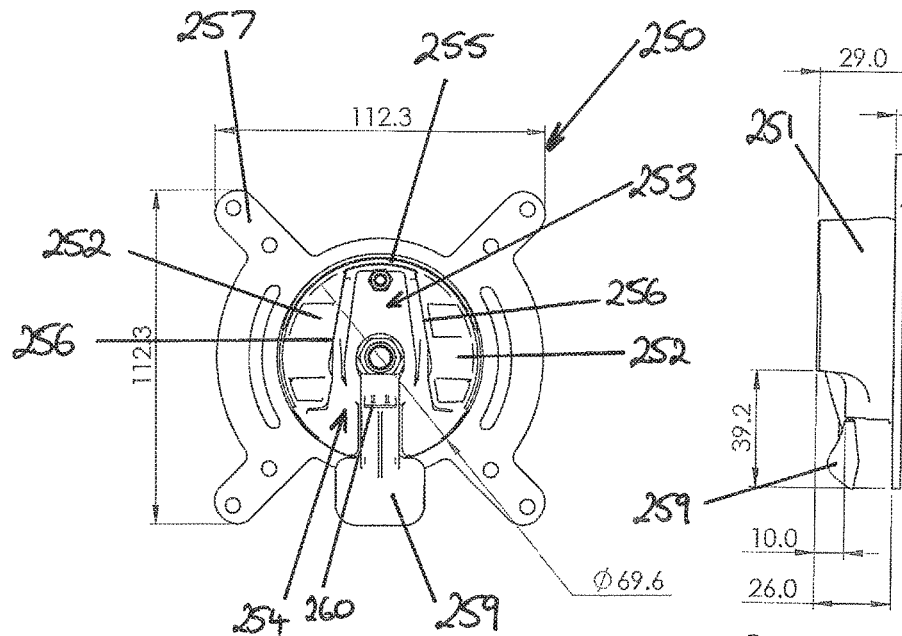
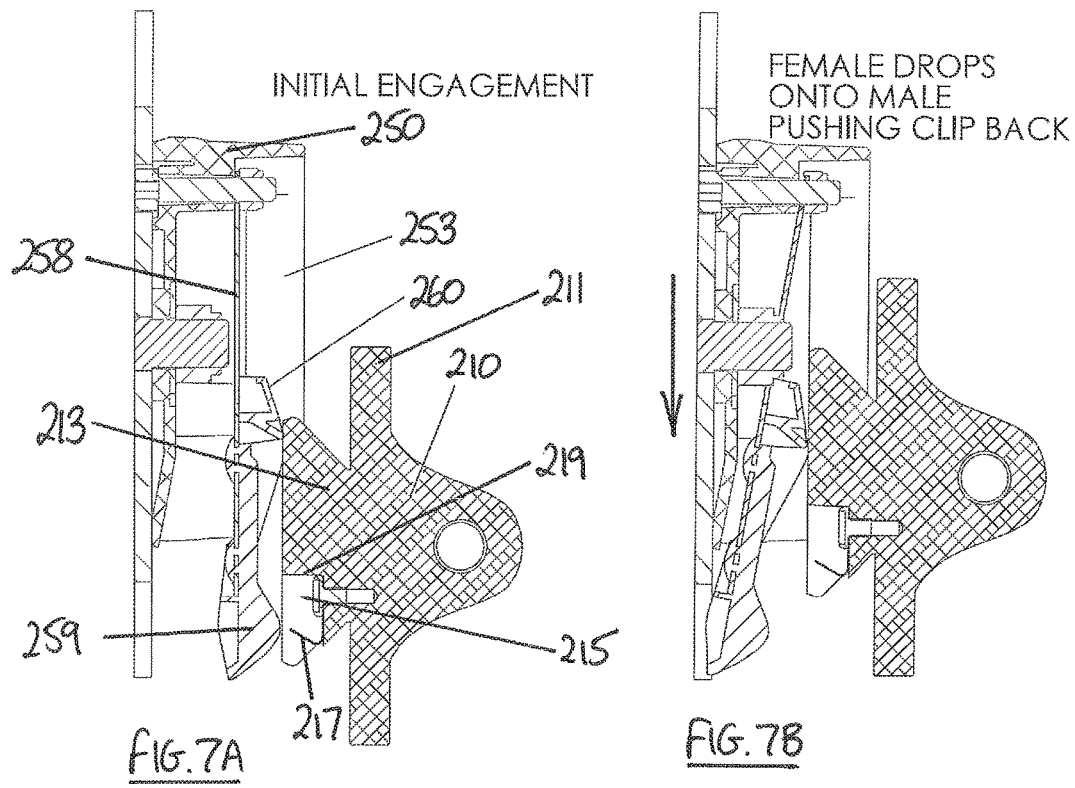

CLIP MOVES INTO NEUTRAL POSTION DURING
ENGAGEMENT AND DISPLACES MALE SPRING

LOCATED AND
LOCKED IN PLACE
MALE AND FEMALE
CANNOT DEPART
DUE TO THE CLIP

CLIP PULLED FORWARDS
AND HELD OUT BY MALE
SPRING

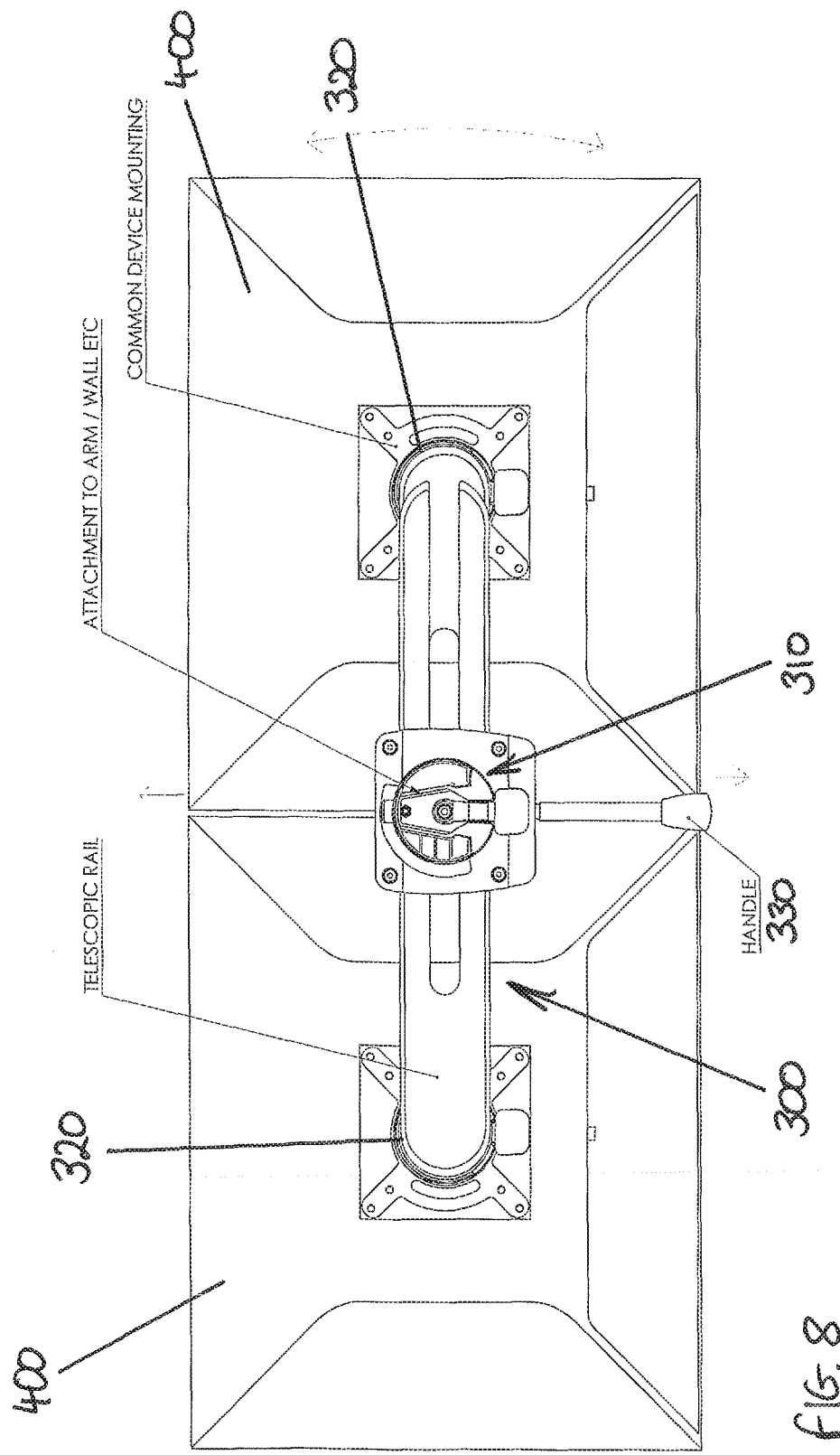

ONE RAIL IS TOOTHED AT THE BOTTOM

THERE ARE TWO GEARS SHARING THE SAME AXLE

A-A

DUE TO THE RAILS BEING TOOTHED IN OPPOSITION THEY MOVE IN OPOSING DIRECTIONS WHEN THE GEAR IS TURNED
THE GEARS ARE OFFSET BY 1/2 A TOOTH SO THAT THE RAILS ALIGN CORRECTLY

THE OTHER RAIL IS TOOTHED AT THE TOP

B-B

DISPLAY SCREEN MOUNTING

TECHNICAL FIELD

The invention relates to devices for mounting display screens, including conventional computer monitors, flat screen displays, television screens, tablets, laptops, touch screens and the like. In particular, the invention relates to a mounting head for mounting a display screen, a device for mounting two display screens, and an articulated support arm for mounting a display screen. The invention seeks to overcome problems with current devices for mounting display screens and to provide improved technical features.

SUMMARY OF THE INVENTION

In accordance with a first aspect, the present invention provides a mounting head for mounting a display screen to a support, the mounting head comprising a male part for attachment to one of the display screen and the support and a female part for attachment to the other of the display screen and the support, the male and female parts being engaged together to mount the display screen on the support, wherein the male part comprises a projection which locates in a channel provided on the female part, the channel having an open end and a closed end, the projection being movable relative to the female part in an engaging direction along the channel from the open end to the closed end to adopt the engaged position, wherein the mounting includes a latch mechanism to lock the male and female parts in the engaged position, wherein the latch mechanism automatically adopts a locked position which locks the male and female parts together when the projection moves in the engaging direction to the closed end of the channel, wherein, when the male and female parts are locked together, the latch mechanism is movable to a release position allowing the projection to move relative to the female part in a disengaging direction along the channel from the closed end towards the open end such that the male and female can be disengaged from one another, and wherein the latch mechanism is able to remain in the release position without the application of a biasing force.

Preferably, the latch mechanism is mounted on the female part. Further, the latch mechanism may comprise a lever which is biased towards the locked position. The lever may include a latch which engages a notch in the projection in the locked position, preventing movement of the projection in the disengaging direction. Preferably, the latch is wider at its outer end forming a heel.

In a preferred arrangement, the latch acts against a spring as it moves to the locked position. The spring is preferably a flat, cantilevered spring forming an acute angle to receive the heel of the latch. In either of these embodiments, when the lever is moved from the locked position to the release position, the latch pushes against the spring and moves past, acting against the spring biasing force, and is retained in the release position by means of the spring returning to its rest position and acting against the latch.

Preferably, the projection is provided with two notches. This allows engagement with the female part in two different positions, rotated by 90 degrees.

In accordance with a second aspect, the invention provides a device for mounting two display screens to a support, the device comprising a support rail which is variable in length, a mounting head substantially in the centre of the support rail for mounting the device to the support, and a mounting head at each end of the support rail for mounting a display screen to the device, wherein the support rail length is controlled by an adjusting mechanism which has a single length-adjusting control which simultaneously lengthens or shortens each side of the support rail to move the display screen mounting heads closer together or further apart.

In a preferred embodiment, the mounting head for mounting the device to the support is configured such that the rail can be mounted in a substantially horizontal or a substantially vertical configuration in use. This could be achieved by permitting the rail to rotate relative to the mounting head for mounting the device to the support. Means may be provided for locking the rail in position relative to the mounting head for mounting the device to the support.

Preferably the support rail is telescopic, and more preferably the support rail comprises two beams which overlie each other and move relative to one another.

In a preferred embodiment, the adjusting mechanism comprises two pinion gears on a common shaft connected to the length-adjusting control and in which each beam is provided with a rack which engages with a respective pinion gear, the gears being rotated by the length-adjusting control to move the beams relative to one another and lengthen or shorten each side of the support rail. Each rack may be provided on one internal edge of a slot provided in each beam, the racks being provided on opposite internal edges so that the beams are simultaneously moved in opposite directions as the length-adjusting control is rotated.

In this aspect of the invention, one or more of the mounting heads may be a mounting head of the first aspect described above and below.

In accordance with a third aspect, the invention provides an articulated support arm for mounting a display screen to a fixed surface and including the male part or the female part of the mounting head of the first aspect. In accordance with a fourth aspect, the invention provides an articulated support arm for mounting a display screen to a fixed surface and including the mounting head of the first aspect.

In accordance with a fifth aspect, the invention provides an articulated support arm for mounting a display screen to a fixed surface and including the device for mounting two display screens in accordance with the second aspect.

The articulated support arm of the third, fourth or fifth aspects may further include a coil spring to provide an adjustable support force at the display screen end, and an adjusting mechanism to adjust the tension or compression of the spring to adjust the support force provided, wherein the adjusting mechanism is coaxial with the axis of the coil spring. The adjusting mechanism may comprise a rotatable collar.

In at least preferred embodiments, the mounting head of the first aspect of the present invention provides an automatic, self-latching/locking function and a manual unlocking function, which allows the male and female sections to be unlocked/released and then separated without the continued application of a release force to the mounting head. Therefore, it is possible to safely remove a display from the support with both hands, which is particularly beneficial with larger display screens.

The device for mounting two display screens to a support of the second aspect of the invention, at least in preferred embodiments, provides a convenient way of mounting two displays to a single support. The spacing between the displays is adjusted with a single control which simultaneously separates or brings together the two screen mountings. The device can be configured to mount the two screens horizontally side-by-side or vertically one above the other.

The articulated support arm of the third, fourth or fifth aspects, at least in preferred embodiments, provides an adjustment mechanism which does not require tools to operate, and which is conveniently integrated into the body of the support arm with the components generally lying on the axis of the arm. The resulting overall design is less complex, more visually appealing and simpler to operate.

BRIEF DESCRIPTION OF THE DRAWINGS

Embodiments of the invention will now be described by way of example only and with reference to the accompanying drawings, in which:

FIGS. 5A-5C show the male section of the mounting head in accordance with one aspect of the invention, with FIG. 5A showing the male section in perspective view, FIG. 5B showing the front view and FIG. 5C the side view;

FIGS. 6A-6C show the male section of the mounting head in accordance with aspects of the invention, with FIG. 6A showing the male section in perspective view, FIG. 6B showing the front view and FIG. 6C the side view;

FIGS. 7A-7G show in sequence the latching and unlatching of the male and female sections of the mounting head in accordance with one aspect of the invention;

FIG. 8 shows a side elevation view of a telescopic rail, in accordance with another aspect of the invention;

DETAILED DESCRIPTION OF A PREFERRED EMBODIMENT

Figure 1:
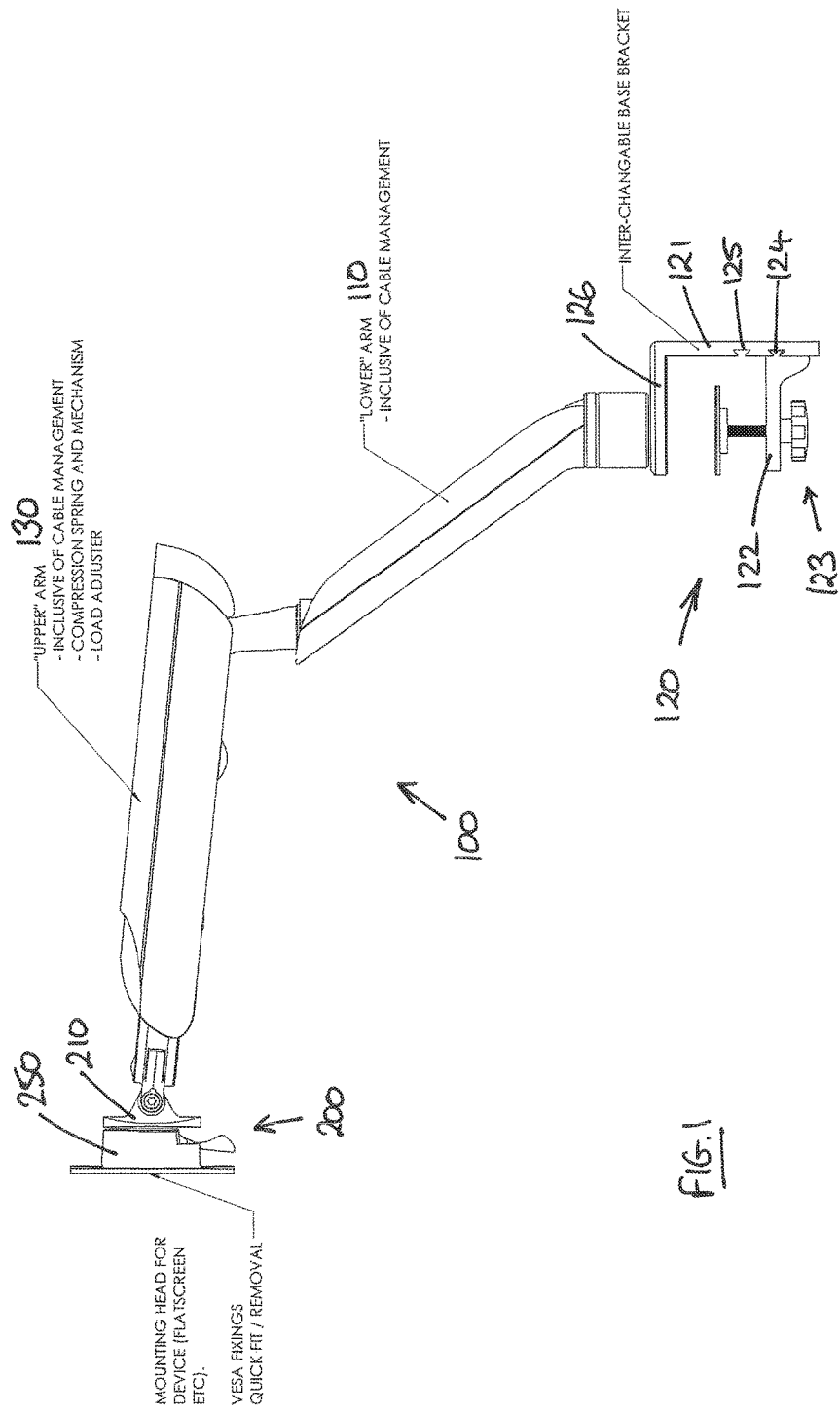
FIG. 1 shows a side view of an articulated support arm in accordance with one aspect of the invention.

FIG. 1 shows a side view of an articulated support arm 100 for a display (not shown), in accordance with a preferred embodiment of the invention. Support arm 100 comprises a lower arm 110 and an upper arm 130. Lower and upper arms 110, 130 are able to move relative to one another by means of one or more articulating joints described below. Upper arm 130 can rotate in horizontal and vertical planes relative to lower arm 110.

Lower arm 110 is secured to a support surface such as a desk, floor or wall by means of any suitable mounting. FIG. 1 shows a C-clamp 120 for mounting to a desk or table. Other designs of mounting or clamp can be used with the support arm of the present invention, including the applicant's commercial "Monobeam" clamp, as well as conventional desk grommets and through-posts. The main requirement is that the mounting provides a vertical spigot 126 (FIG. 2) on which the end of the lower arm 110 locates and about which it can rotate. A stop such as a grub screw 127 (FIG. 2) may be employed to limit the extent of rotation of the lower arm 110 relative to the mounting.

The C-clamp 120 shown in FIG. 1 comprises an L-shaped bracket 121, a lower plate 122 and a screw clamp assembly 123. Lower plate 122 is provided with a dovetail projection 124 which slides into a dovetail groove 125 in the L-shaped bracket. By providing more than one groove 125 at different distances from the top plate 126 of the L-shaped bracket, a coarse level of adjustment of the jaw size can be provided prior to tightening the screw clamp assembly 123. This feature also allows the C-clamp to be employed where there is limited clearance to place the clamp around the support surface, for example if the desk is close to a wall and cannot be moved out easily. The C-clamp is effectively assembled around the support surface in situ, with the bracket 121 being lowered from above and the lower plate 122 then being inserted in the appropriate dovetail groove 125 from underneath, and the screw clamp assembly tightened onto the support surface underside. A surface-to-wall spacing of only about 10 mm is typically required. No tools are needed to assemble the C-clamp.

Figure 2:
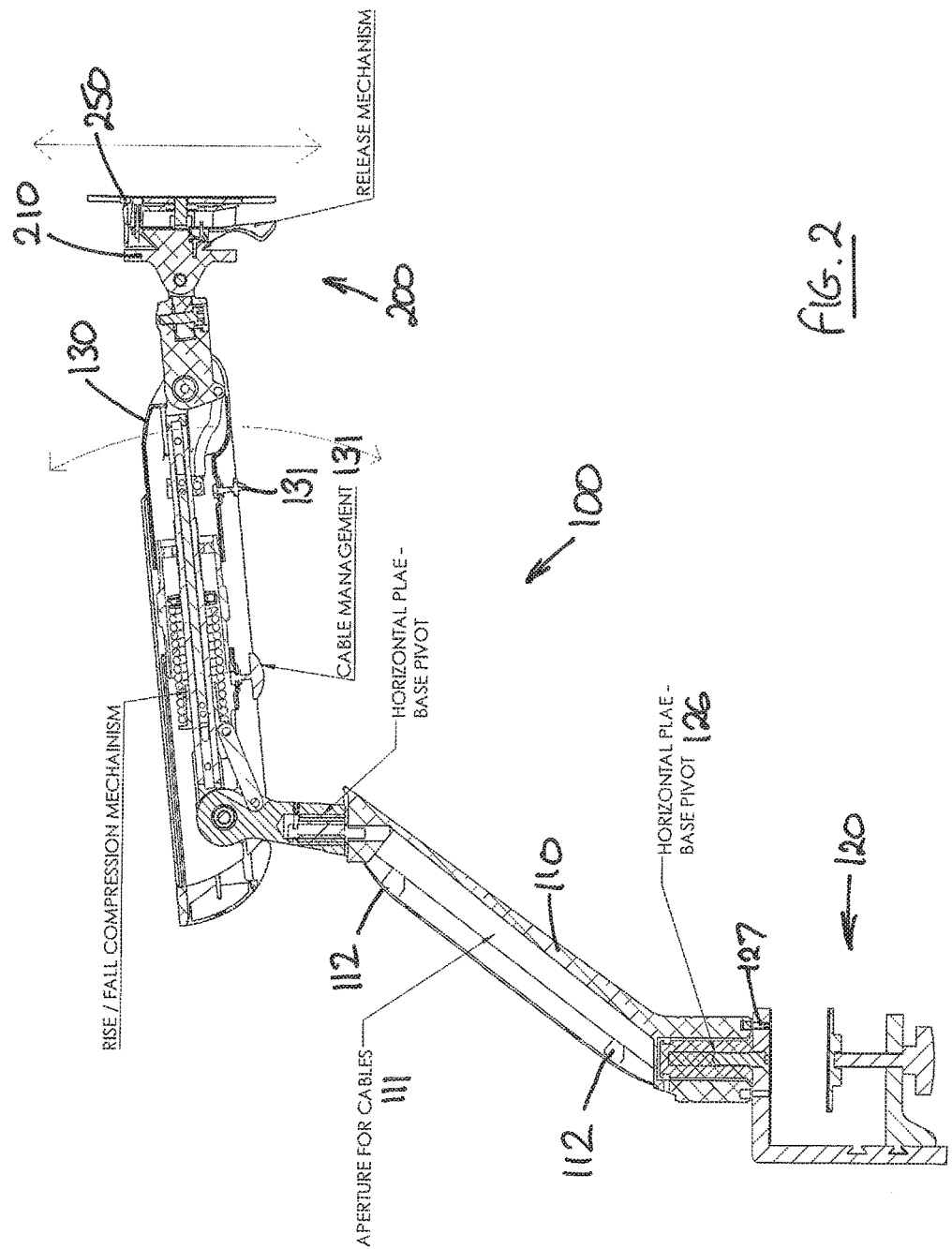
FIG. 2 shows a cross-sectional side view of the articulated support arm of FIG. 1.

FIG. 2 shows a cross-sectional side view of the articulated support arm 100 of FIG. 1. In this view, the cable management features can be seen, which are provided to stow display cables neatly and safely, so that they do not foul the support arm or look untidy. Lower arm 110 has a central core 111 for carrying the cables, which are pushed past two tabs 112 on the upper surface, which keep the cables in place. Upper arm 130 is provided with two rotatable T-clips 131 so that cables can be stowed on the underside of the arm held in place by the T-clips.

Figure 3:
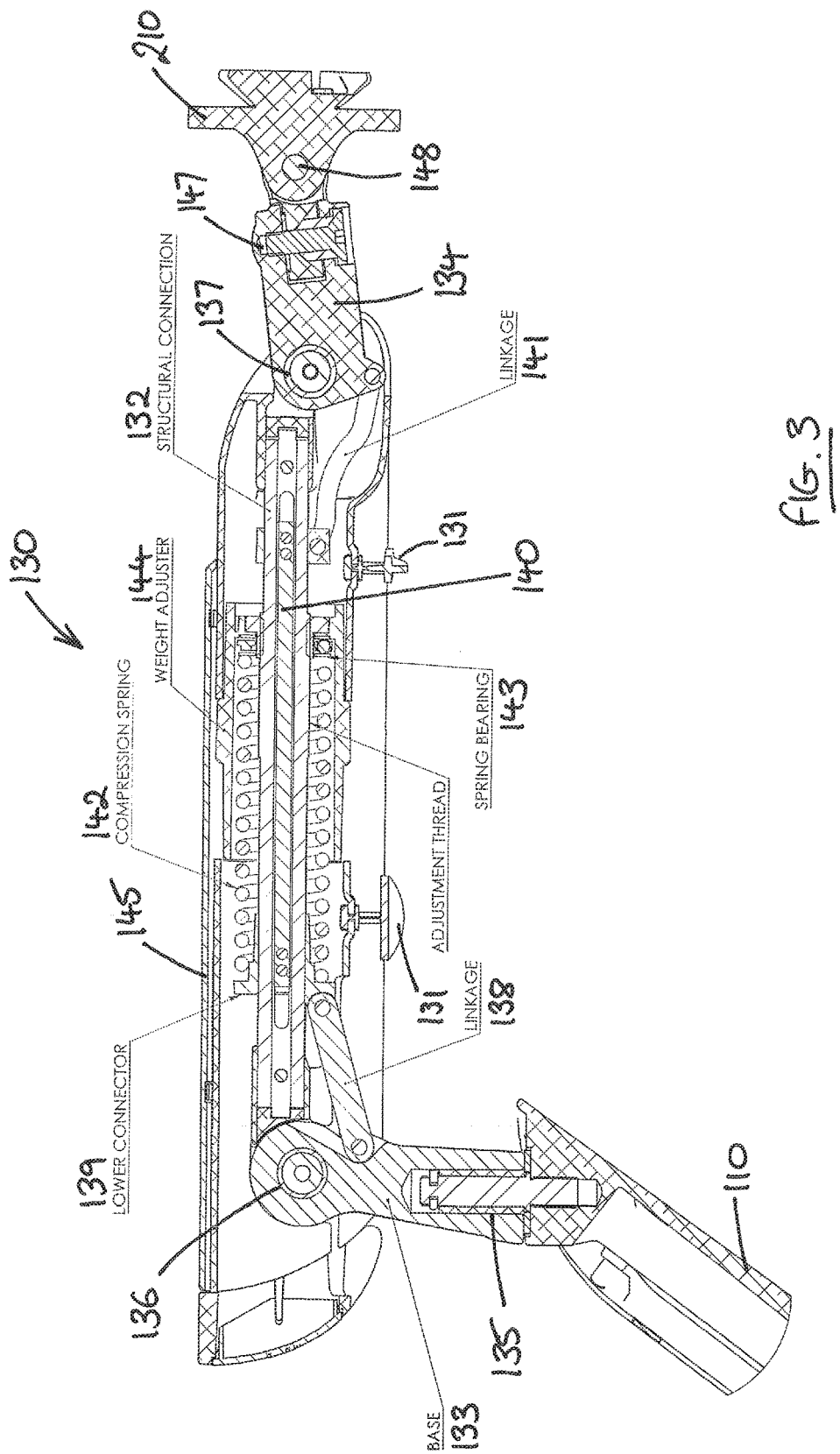
FIG. 3 shows an enlarged cross-sectional side view of the upper arm of the articulated support arm of FIG. 2.

FIG. 3 shows an enlarged cross-sectional side view of the upper arm 130 and articulating joints of the articulated support arm 100.

Upper arm 130 is comprised of a central support section 132 and lower and upper extension sections 133 and 134 respectively. Lower extension section 133 is connected to lower arm 110 via spigot-and-socket joint 135 having a substantially vertical rotational axis which allows rotation of the upper arm 130 relative to lower arm 110 in a horizontal plane. Lower extension section 133 is able to rotate relative to the upper arm central section 132 by means of pivot 136 having a substantially horizontal rotational axis which allows rotation of the upper arm 130 relative to lower arm 110 in a vertical plane. Upper extension section 134 is able to rotate relative to the upper arm central section 132 by means of pivot 137.

The two extension sections 133 and 134, in addition to being connected via the central support section 132, are also connected by a linkage mechanism which keeps the two extension sections in the same vertical orientation relative to one another while the central support section is moved. This maintains the display screen at the same angle to the vertical while moving the arm to change the display height, for example. The linkage mechanism comprises linkage 138, connector 129, linkage connecting rod 140 and linkage 141.

The weight adjustment mechanism comprises a compression spring 142 which provides an opposing force between the connector 139 and the spring bearing 143. At the bearing end, the force is transmitted to the lower extension section 133 via the adjuster nut 144 and the central support section 132. The other end of the spring acts on linkage connector 129. Due to the line of action of the linkage being offset from the pivot 136 in the lower extension section 133, the force in the linkage causes a torque which in turn tends to rotate the central support section 132 and thus the upper arm 130 about the pivot 136. When the mechanism is balanced, this torque is in equilibrium with the torque about the pivot induced by the load at the other end of the arm.

The torque provided by spring 142 is adjusted by means of adjuster nut 144 which runs up and down a thread on central support section 132. A hand grip is provided on the outside of nut 144, which is visible to the user when the top cover 145 is lifted. Rotation causes the nut and the bearing 143 to change position along the threaded portion of the central support section 132, thereby changing the length of the space that the spring can work in so that it provides a greater or lesser force within the mechanism as required to balance the load. The bearing 143 reduces the friction caused by the thrust of the spring and the load on the arm in order to allow the adjuster to rotate.

The user adjusts the adjuster until just enough balance force is provided to maintain the arm in equilibrium. The user is aided in this endeavour by friction that is built in to the pivot 136 that gives a range of forces which will balance, thus avoiding the need to be precise in the adjustment. The adjuster of this preferred embodiment does not require tools to operate, and it is conveniently integrated into the body of the support arm. Arrows or plus/minus signs may be provided to assist with finding the correct adjustment direction, and the movement may be notched to indicate the level or degree of tension.

Figure 4:
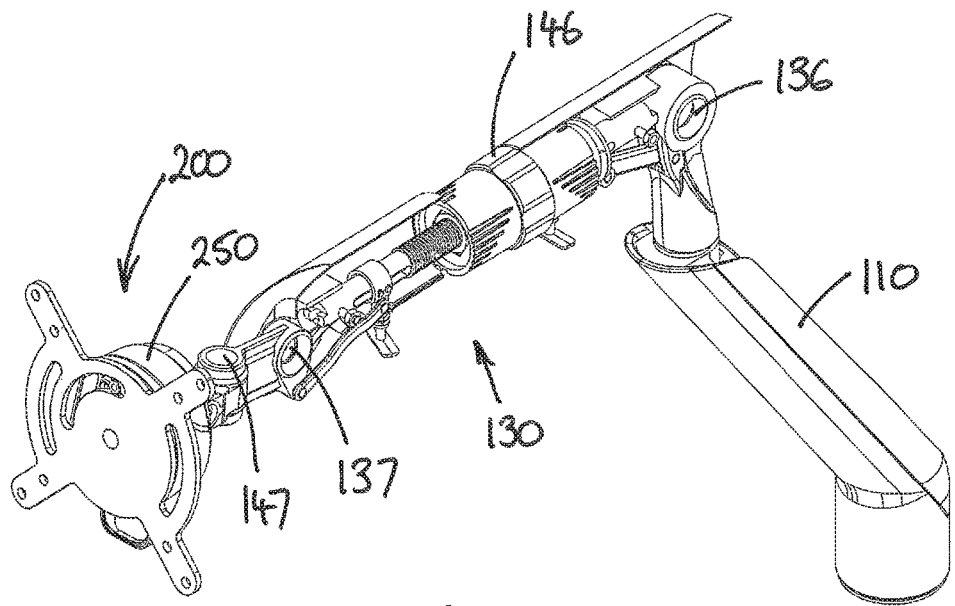
FIG. 4 shows a perspective partial cut-away view of the articulated support arm of the invention.

FIG. 4 shows a perspective view of the articulated support arm 100 with a cut-away view of the upper arm 130 (with top cover 145 removed), showing the adjuster hand grip 146.

With reference to FIGS. 1-4, the mounting head is shown generally as 200 and comprises male section 210 and female section 250. With reference to FIG. 3, male section 210 is able to rotate relative to upper arm 130 by means of pivots 147 and 148 which allow rotation in orthogonal planes.

Figure 5A:
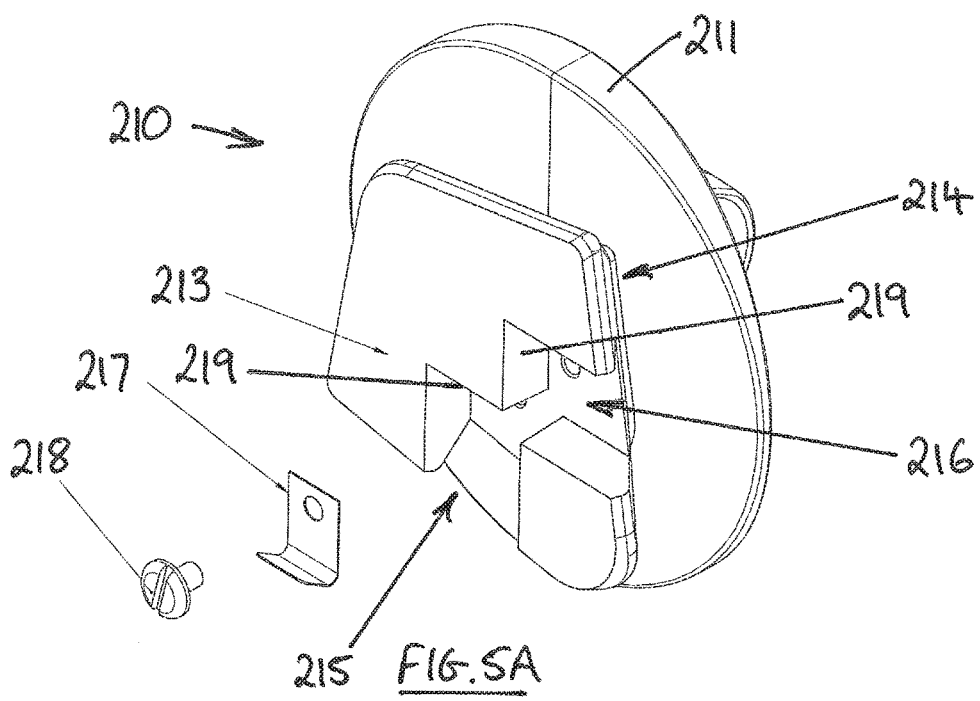

FIG. 5A shows the male section 210 in perspective view, FIG. 5B shows the front view and FIG. 5C the side view. In a preferred embodiment, male section 210 is made from an aluminum casting. It has a circular rear flange 211 to the rear of which is provided a boss 212 which connects to upper arm 130 and forms part of the pivot joint 148 referred to above. Projection 213 is provided on the front face of flange 211. Projection 213 increases in width from the flange 211 as can be seen in FIG. 5C so that a triangular groove or channel 214 is formed between the flange and the projection. This is the part which locates and engages with the female section 250 described below.

With reference to FIG. 5B, projection 213 has a generally four-sided shape with notches 215 and 216 cut out of two of the adjacent sides. With either notch placed at the 6 o'clock position, the sides of the projection converge in a direction towards the 12 o'clock position so that the projection is narrower at the top than at the bottom. The presence of two notches and the shape of the projection allows the male section 210 to engage with the female section 250 in two different orientations 90 degrees apart.

A flat spring 217 which is generally J-shaped and held in by screw 218 is located centrally in each notch 215 and 216, although only one spring is shown in the figures.

FIG. 6A shows the female section 250 in perspective exploded view, FIG. 6B shows the front view of the assembled component and FIG. 6C the side view. Female section 250 comprises a main body 251 which is a short cylinder in overall shape. The front face 252 of the main body 251 has a channel 253 which has an open end 254 on one side of the cylinder due to the absence of the cylindrical wall on that side, and which has a closed end 255 which is closed by the cylindrical wall at the other end. The width of the channel narrows towards the closed end 255. Inside the main body 251, behind the front face, the channel opens out to accommodate the projection 213 of the male section 210 when the two components are engaged. The two side edges 256 of the front face which form the channel locate in the groove 214 of the male section.

Attached to the rear of the main body 251 is a mounting plate 257 which is mounted to the rear of the display screen. A preferred type of mounting plate conforms to the "VESA" standard, in which the four outer mounting holes are spaced 100 mm apart and the four inner mounting holes are spaced 75 mm apart.

The latching mechanism which locks the male and female sections 210 and 250 together comprises the upper edge 219 of the notch 215 or 216 and the spring 217 on the male section 210, and the other main component of the female section 250, which is locking lever 258, which may also be referred to as a clip or clip spring. Lever 258 is preferably made from spring steel in order to provide the required resilience.

Lever 258 is a generally elongate component which is shaped to fit within the profile of the channel 253 in the main body 251 as defined by the two side edges 256. Lever 258 is attached at its upper end to the main body 251 but nowhere else along its length. At its lower end, a tab 259 is provided. Approximately at the centre, a latch projection 260 is provided, which will be discussed in more detail below.

In the absence of a biasing force, the lever 258 will tend to extend generally straight down from its attachment point, generally parallel to the rear wall of the main body 251. Due to its inherent resilience however, when a biasing force is applied to the lever (e.g. to the tab 259 or to the latch projection 260), the lever can be pushed back to adopt an angled position relative to the rear wall of the main body. Therefore, the lever has a first, rest position (generally vertical, no biasing force) and a second, retracted position (angled back towards rear wall, biasing force applied).

With reference to FIG. 7, the latching and unlatching of the male and female sections 210 and 250 will now be described. FIGS. 7A-7E show the latching process in order, with the components locked together in FIG. 7E. FIGS. 7F and 7G show the unlatching process.

Reference numbers for the important features are shown in FIG. 7A but are omitted from the other figures for clarity.

FIG. 7A shows the initial engagement between the male section 210 and the female section 250 as the projection 213 of the male section 210 is being inserted into the channel 253 due to the female section moving in the direction of the arrow relative to the male section. Clip or lever 258 is in its rest position, with the projection 213 just making initial contact with latch projection 260 of the lever 258.

In FIG. 7B, the projection has reached the limit of horizontal insertion into the channel, and latch projection 260 is pushed back to its maximum extent so that lever 258 is in the retracted position, with the projection providing the biasing force against the inherent resilience of the lever. Male section 210 is now moved vertically upwards in the channel relative to the female section 250, which moves downwards in the direction of the arrow.

Figure 7C:
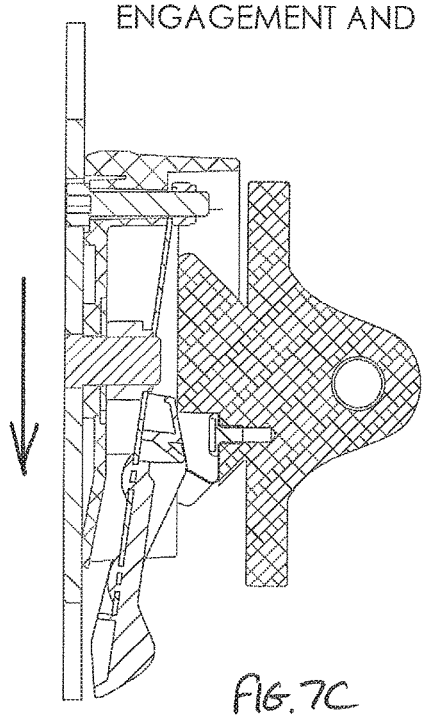
Figure 7D:
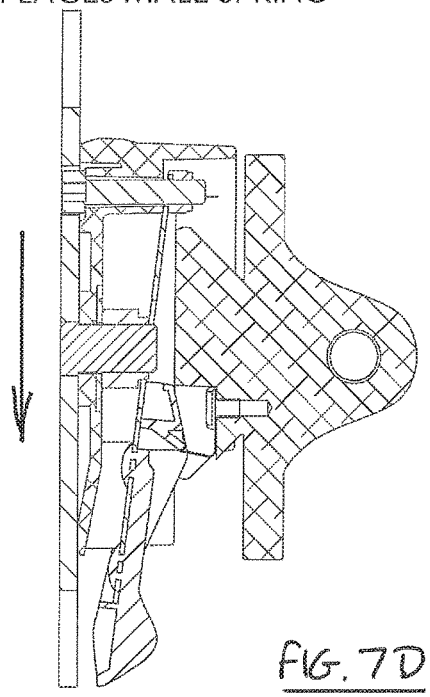
Figure 7E:
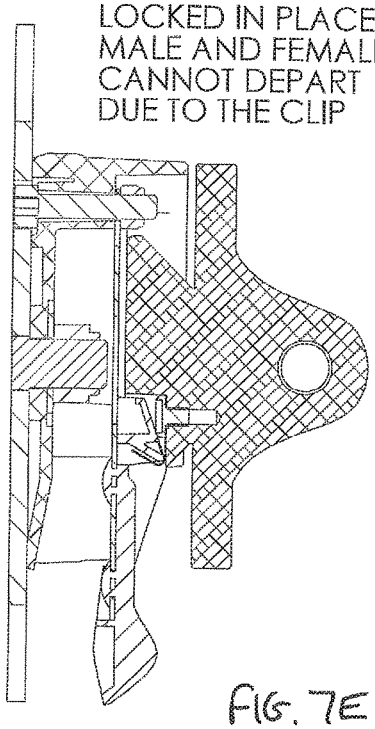

FIGS. 7C, 7D and 7E show the sequence of engagement of the latch projection 260, upper edge 219 of the notch 215 and the spring 217.

In FIG. 7C, the lower edge of latch projection 260 just edges into the notch 215 by virtue of the angle on the front face of the projection as the female section moves down. In FIG. 7D, the lower edge of latch projection 260 has caught the end of the spring 217 and biases it downwards as the female section continues to move downwards. Due to the inherent resilience of the lever 258, as soon as the top edge of latch projection 260 is clear of the upper edge 219 of the notch 215, latch projection 260 will snap into the notch as shown in FIG. 7E, thus locking the sections together by virtue of the upper edge 219 being adjacent the upper edge of latch projection 260. Male spring 217 also hooks around the lower edge of latch projection 260 as shown, to provide additional security.

Figure 7F:
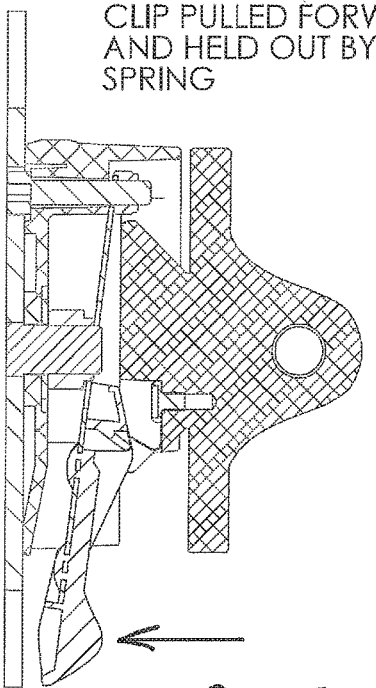
Figure 7G:
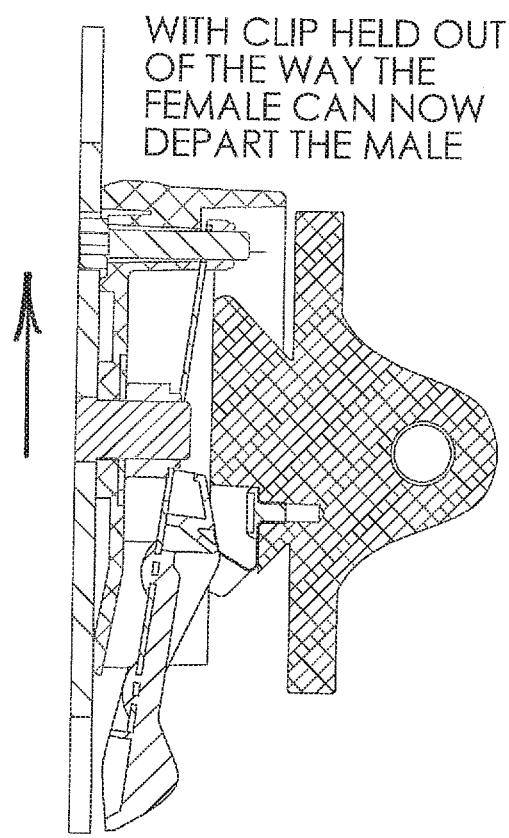

The disengagement process is shown in FIGS. 7F and 7G. Tab 259 of lever 258 is pushed backwards manually, which causes latch projection 260 to move out of the notch 215, biasing the end of spring 217 downwards as it does so. Once the lower edge of latch projection 260 passes the end of the spring 217, the spring will return to its rest position by moving upwards. The spring then acts against the latch projection 260 and holds it in this release position, against its inherent biasing force, so the manual biasing force can be removed. As shown in FIG. 7G, the female section can then be moved upwards in the direction of the arrow to completely separate the components.

Therefore, it can be seen that the mounting head of the present invention provides an automatic, self-latching/locking function and a manual unlocking function, which allows the male and female sections to be unlocked/released and then separated without the continued application of a release force to the mounting head. Therefore, it is possible to safely remove a display from the support with both hands, which is particularly beneficial with larger display screens.

A further aspect of the invention relates to a device for mounting at least two display screens to a support. FIG. 8 shows a preferred embodiment of such a device, in the form of telescopic rail 300. FIG. 8 is an elevation view looking at the rear of two display screens 400. Rail 300 includes a centrally-located mounting head 310 which mounts the device to a support, such as a support arm or a wall mounting. A suitable support arm is the support arm 100 described above. The mounting head itself may be the mounting head 200 as described above, or more precisely the male section 201 or the female section 250 of such a mounting head. In the embodiment shown, the mounting head 310 is the female section 250 as described above.

Two mounting heads 320 are provided at each end of the rail 300, which mount the displays. Any suitable mounting head may be used, but in the preferred embodiment, the mounting heads are the same as those described above, with the male sections 210 being provided on the rail 300 and the female VESA-type sections 250 being mounted to the displays. A handle 330 is provided for fine adjustment of the rail position (e.g. plus or minus 5 degrees) to allow for slightly different monitor sizes for example.

Figure 9:
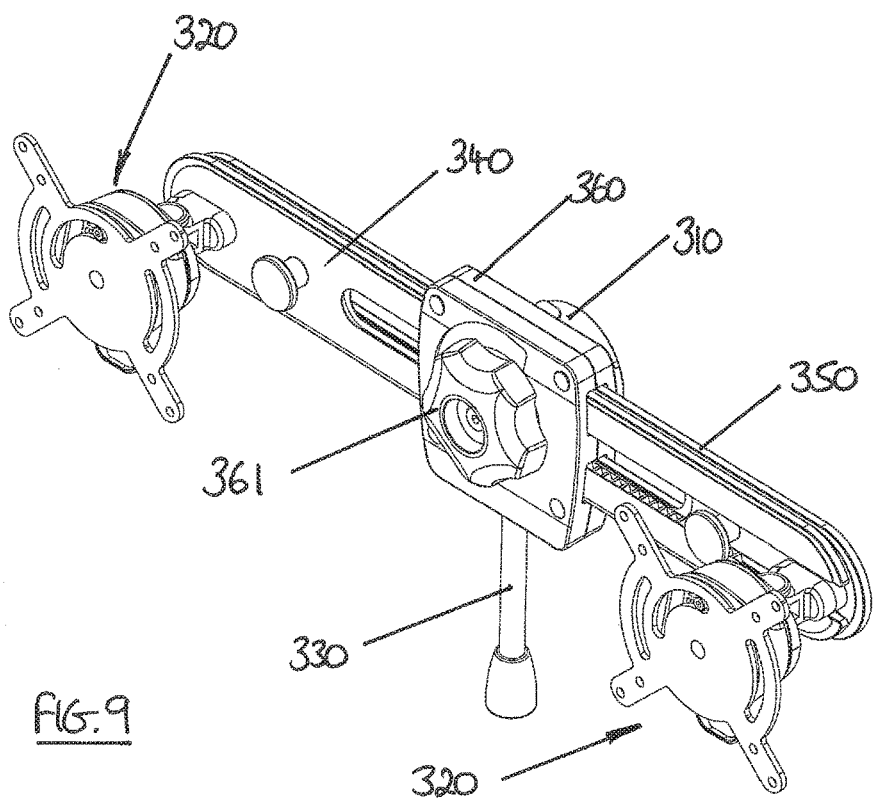
FIG. 9 shows a perspective view of the rail of FIG. 8 from the other side.

FIG. 9 shows a perspective view of the rail 300 of FIG. 8 from the other side. The rail itself comprises two elongate plates, a front plate 340 and a rear plate 350. One mounting head 320 is mounted to front plate 340 and the other is mounted to rear plate 350. Each plate has a respective slot 341 and 351 to allow them to slide telescopically relative to one another.

In the centre of the rail 300, adjacent to the central mounting head 310, is a gearbox 360 which is provided with an adjusting knob 361 on the outside, on the side of the rail opposite the central mounting head 310 as shown. Adjusting knob 361 is used to set the level of telescoping and therefore the spacing between the mounting heads 320.

Figure 10:
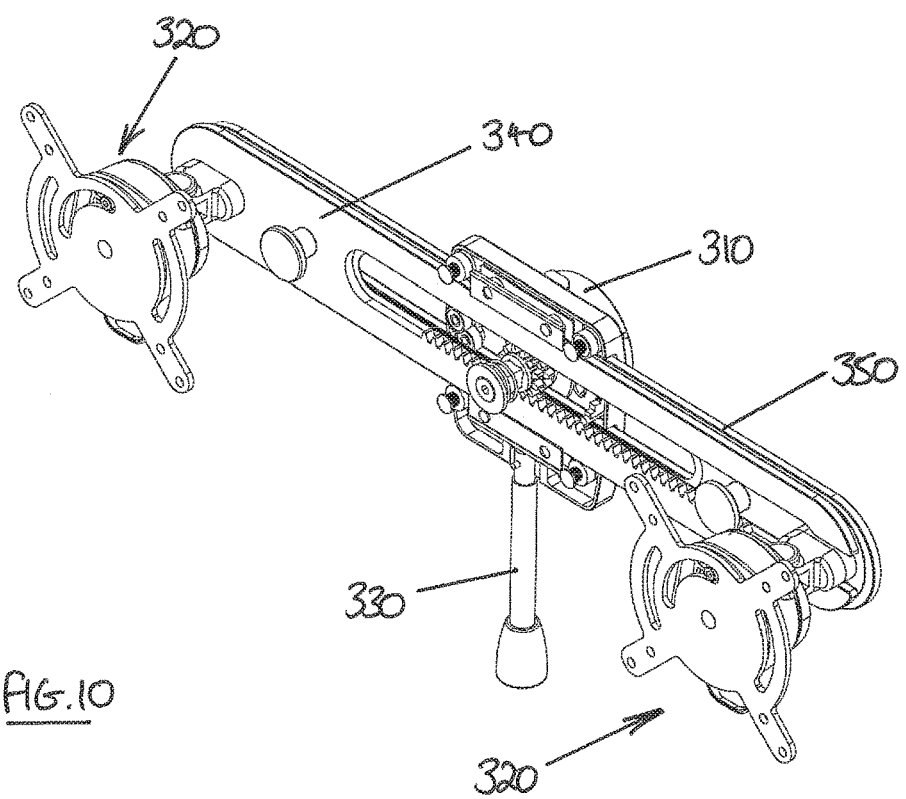
FIG. 10 shows the same view with the adjusting knob and gearbox front cover removed.
Figure 11:
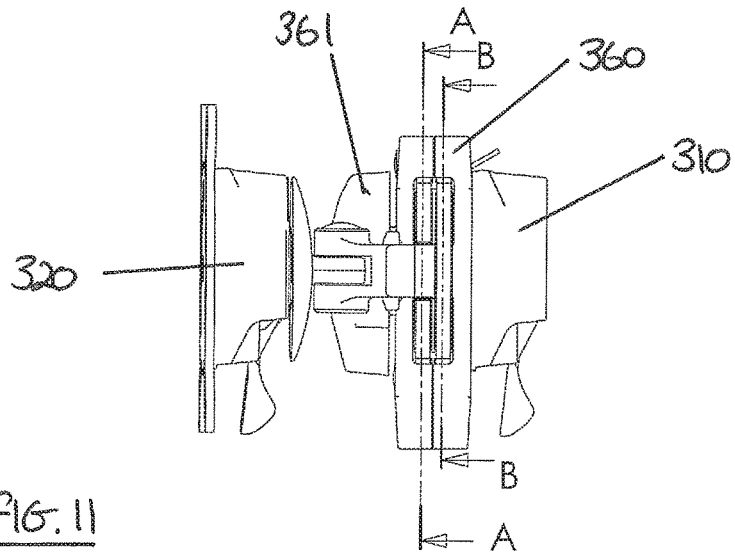
FIG. 11 shows a side view of the rail of FIG. 8.
Figure 12A:
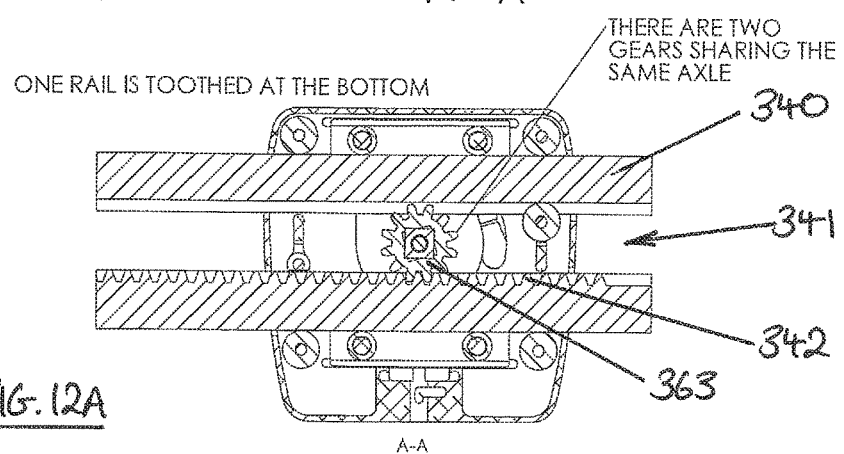
FIGS. 12A and 12B show respectively cross-sectional views taken along lines A-A and B-B in FIG. 11.
Figure 12B:
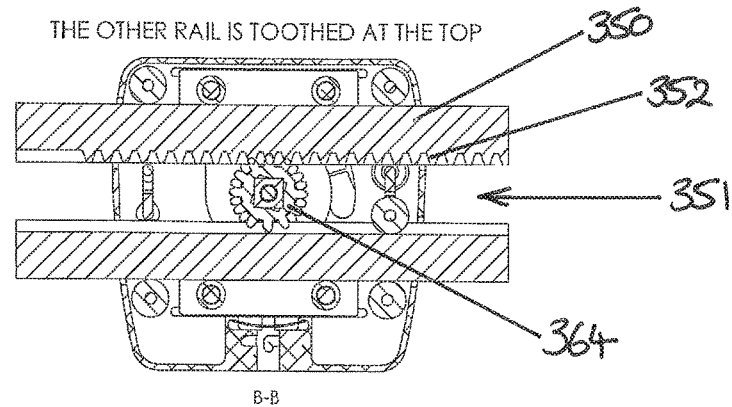

FIG. 10 shows the same view as FIG. 9 but with the adjusting knob 361 and the front cover of the gearbox 360 removed. FIG. 11 shows a side view of the rail 300, and FIGS. 12A and 12B show respectively cross-sectional views taken along lines A-A and B-B in FIG. 11. With reference to all of these figures, the adjusting mechanism can be understood.

Adjusting knob 361 is connected to shaft 362, on which front gear 363 and rear gear 364 are mounted. Front gear 363 engages with a toothed rack 342 which is provided on the lower inner edge of slot 341 of the front plate 340. Rear gear 364 engages with a toothed rack 352 which is provided on the upper inner edge of slot 351 of the front plate 350. Therefore, rotation of the shaft 362 in either direction will cause the plates to move in opposite directions simultaneously, either shortening or lengthening the overall length of the rail in the process.

The rail 300 may be employed in a substantially horizontal configuration as shown, or it may be used in a vertical configuration. A lockable pivot may be provided to allow rotation from one configuration to the other.

The invention claimed is:

1. A mounting head for mounting a display screen to a support, the mounting head comprising:
    a spring;
    a male part configured and arranged for attachment to one of the display screen and the support, the male part having a projection; and
    a female part configured and arranged for attachment to the other of the display screen and the support, the female part including channel having an open end and a closed end, the male and female parts being engaged together to mount the display screen on the support with the projection located in the channel, the projection being movable relative to the female part in an engaging direction along the channel from the open end to the closed end to adopt an engaged position; and
    a latch mechanism including a lever having a latch, the latch mechanism being configured and arranged to
        lock the male and female parts in the engaged position and to adopt a locked position that locks the male and female parts together when the projection moves in the engaging direction to the closed end of the channel, the lever being biased towards the locked position and the latch being configured and arranged to act against the spring as the latch moves to the locked position and to engage a notch in the projection in the locked position, preventing movement of the projection in a disengaging direction, and
        when the male and female parts are locked together, move to a release position allowing the projection to move relative to the female part in a disengaging direction along the channel from the closed end towards the open end such that the male and female can be disengaged from one another.

2. The mounting head of claim 1, in which the latch mechanism is mounted on the female part.

3. The mounting head of claim 1, in which the latch is wider at its outer end forming a heel.

4. The mounting head of claim 1, in which the spring is a flat, cantilevered spring forming an acute angle to receive a heel of the latch.

5. The mounting head of claim 1, the latch being configured and arranged with the spring to, when the lever is moved from the locked position to the release position, push against the spring and move, acting against the spring biasing force, and remain in the release position via the spring returning to a rest position and acting against the latch.

6. The mounting head of claim 1, in which the projection is provided with two notches allowing engagement with the female part in two different positions, rotated by 90 degrees.

7. An apparatus comprising:
an articulated support arm configured and arranged to mount to a fixed surface; and
a mounting head component connected to the articulated support arm and configured and arranged to mount to a display screen, the mounting head component including one or both of a male part and a female part, in which:
   the male part is configured and arranged for attachment to one of the display screen and the articulated support arm, the male part having a projection, and
   the female part is configured and arranged for attachment to the other of the display screen and the articulated support arm, the female part including channel having an open end and a closed end, the male and female parts being configured and arranged to engage together to mount the display screen on the support with the projection located in the channel, the projection being movable relative to the female part in an engaging direction along the channel from the open end to the closed end to adopt an engaged position;
a coil spring configured and arranged to provide an adjustable support force at an end of the articulated support arm at which the display screen mounts, the articulated support arm having an adjusting mechanism configured and arranged to adjust tension or compression of the coil spring to adjust the support force provided, wherein the adjusting mechanism is coaxial with an axis of the coil spring;
a further spring; and
a lever having a latch and being configured and arranged to
   with the male and female parts in the engaged position, lock the male and female parts together when the projection moves in the engaging direction to the closed end of the channel by biasing the lever toward the lock position and using the latch to engage a notch in the projection in the locked position and acting against the further spring as the latch moves to the locked position, and
   when the male and female parts are locked together, move to a release position allowing the projection to move relative to the female part in a disengaging direction along the channel from the closed end towards the open end such that the male and female can be disengaged from one another.

8. The apparatus of claim 7, wherein the adjusting mechanism includes a rotatable collar.

* * * * *